Patented Aug. 25, 1936

2,052,424

UNITED STATES PATENT OFFICE 2,052,424

AZO DYES AND THEIR PRODUCTION

Wilfred Archibald Sexton, Blackley, Manchester, England, assignor to Imperial Chemical Industries Limited, a corporation of Great Britain No Drawing. Application November 8, 1934, Serial No. 752,187. In Great Britain November 21, 1933

9 Claims. (Cl. 260—95)

A. This invention relates to the manufacture of azo dyes, to new azo dyes, to new intermediates useful in the manufacture of azo dyes, and to methods of making the new intermediates.

B. According to the invention I manufacture the new 3-benzoylamino-4-methoxyaniline by benzoylating 4-nitro-ortho-anisidine and reducing the benzoyl compound. Also according to the invention we diazotize 3-benzoylamino-4-methoxyaniline and convert the resulting diazonium salt to a solid stable zinc chloride double salt. Also according to the invention we couple the diazotized bases, preferably as the zinc chloride double salt, with the 5-chloro-ortho-toluidide of 2,3-hydroxynaphthoic acid, or the 5-methoxy-ortho-toluidide of 2,3-hydroxynaphthoic acid, or the alphanaphthylamide of 2,3-hydroxynaphthoic acid to give dyes of claret shades fast to kier boiling, chlorine, and light.

C. In carrying the invention into practical effect we may work as follows: 4-nitro-ortho-anisidine is benzoylated with benzoyl chloride and the resulting 4-nitro-2-benzoylamino-anisole is reduced with iron and mineral acid in alcoholic medium. Other convenient methods of reduction may be adopted. The amine is isolated as hydrochloride, diazotized in water in any known manner, alone if the diazonium chloride is required, or in the presence of zinc oxide if the zinc double salt is desired.

D. Cotton cloth is impregnated with one of the three hydroxy naphthoic acid arylides mentioned, or with any arylid of beta-hydroxy-naphthoic acid, and is squeezed and immersed in a solution of the diazonium chloride, or of the double zinc diazonium chloride.

E. In preparing a solid stable salt of the diazonium compound I have found it is preferable to stabilize by making the zinc double salt; the other customary method of stabilizing, by use of naphthalene-1,5-disulphonic acid, is unsatisfactory because the salt becomes insoluble in water after standing.

F. The invention is illustrated but not limited by the following example. The parts are by weight.

G. Preparation of a diazo component 4-nitro-2-benzoyl-amino-anisole is made by the action of benzoyl chloride on 4-nitro-ortho-anisidine as described by Meldola and Eyre, (Chemisches Zentralblatt 1901, (2), 98). It has M. P. 160–161°

45.4 parts of this nitro compound are dissolved in 500 parts of boiling alcohol and 100 parts of water and 3 parts of hydrochloric acid added. 100 parts of iron fillings are next added and the mixture boiled under reflux with stirring until reduction is complete. The liquid is neutralized with lime and filtered while still hot. The solvent is removed by evaporation; the sticky residue is dissolved in dilute hydrochloric acid, filtered from any insoluble matter and the hydrochloride of the base is separated by adding common salt.

The free base may be obtained by treating the hydrochloride with ammonia and after recrystallization from dilute methanol it has M. P. 95–6.°

2.8 parts of the 3-benzoyl-amino-4-methoxy-aniline-hydrochlorine are dissolved in 100 parts of cold water containing 2 parts of hydrochloric acid. Diazotization is effected at 10° C. by adding 3.8 parts of 20% sodium nitrite solution and after half an hour neutralizing by adding 3 parts of 50% sodium acetate solution, or by any other process of diazotization. The neutral diazo solution is made up to 500 parts and mixed with 500 parts of a solution containing 0.5 part of 50% acetic acid and 25 parts of sodium chloride.

H. Preparation of a coupling component 4.5 parts of 2,3-hydroxynaphthoic-alpha-naphthylamide are pasted with 9 parts of Turkey red oil and 8 parts of caustic soda (62° Tw.). The paste is dissolved by the addition of 100 parts of boiling water and the solution diluted with a further 900 parts of water. In place of the 2,3-hydroxynaphthoic - alpha - naphthylamide there may be used an equal amount of 2,3 hydroxynaphthoic-5'-chloro-ortho-toluidide or 5 parts of 2,3-hydroxynaphthoic-5'-methoxy - ortho - toluidide.

Cotton is steeped in this so-obtained grounding liquor for half an hour at 25°–30°, the ratio of liquor to cotton being 20:1 by weight. It is then squeezed to remove excess liquor and developed as described hereinafter.

I. Preparation of a zinc double salt 2.8 parts of the amine hydrochloride described above are stirred with 20 parts of water and 4 parts of 36% hydrochloric acid. 5 parts of zinc oxide are dissolved in the mixture which is then cooled to 5° C. and diazotized by the gradual addition of 3.5 parts of 20% aqueous sodium nitrite solution. The solution is filtered and to the filtrate is added salt to separate the zinc diazonium chloride. This zinc salt is filtered off and dried at room temperature.

J. Preparation of a dyestuff

The cotton which has been impregnated with the coupling component is immersed for half an hour in the diazo solution or, alternatively, 3.6 parts of the double zinc diazonium chloride are dissolved in 1000 parts of water containing 25 parts of salt, and the cotton impregnated with the coupling component is steeped therein for half an hour. The dyed cotton is washed, and is finished by boiling for half an hour in a liquor containing 3 parts of soap per 1000 parts of water. The resulting dye is of claret shade and has excellent fastness to chlorine, kier-boiling, and light.

K. An advantage of the invention is that azo colors fast to kier-boiling are produced. Hitherto claret azoic colors fast to kier-boiling were unknown. Fastness to kier-boiling is defined by Rowe, J. Soc. Dyers and Cols. 1931, 33. Another advantage of the invention is derived from the use of a new intermediate in azo colors. Other advantages of the invention flow from the nature of the colors themselves and from the methods of preparing them. Further advantages of the invention will be apparent to persons skilled in the art of dyeing.

L. As many apparently widely different embodiments of this invention may be made without departing from the spirit and scope thereof, it is to be understood that I do not limit myself to the specific embodiments thereof except as defined in the appended claims.

I claim:

1. A dyestuff being 3-benzoylamino-4-methoxy-benzene—N=N—2,3-hydroxynaphthoic-5'-methoxy-o-toluidide.

2. A dyestuff being 3-benzoylamino-4-methoxy-benzene—N=N—alpha-naphthylamide of 2,3-hydroxynaphthoic acid.

3. A dyestuff being 3-benzoylamino-4-methoxy-benzene—N=N—5-chloro-o-toluidide of 2,3-hydroxynaphthoic acid.

4. A dyestuff being 3-benzoylamino-4-methoxy-benzene—N=N—arylide of beta-hydroxy-naphthoic acid.

5. The process of making an azo color which comprises coupling diazotized 3-benzoyl-amino-4-methoxy-aniline with one of a group of compounds consisting of the 5'-chloro-ortho-toluidide of 2,3-hydroxy-naphthoic acid, the 5'-methoxy-ortho-toluidide of 2,3-hydroxy-naphthoic acid, and the alpha-naphthylamide of 2,3-hydroxy-naphthoic acid.

6. The process which comprises coupling diazotized 3-benzoyl-amino-4-methoxy-aniline with an arylide of beta-hydroxy-naphthoic acid.

7. The process which comprises coupling diazotized 3-benzoyl-amino-4-methoxy-aniline with a 5'-methoxy-ortho-toluidide of 2,3-hydroxy-naphthoic acid.

8. The process which comprises coupling diazotized 3-benzoyl-amino-4-methoxy-aniline with a 5-chloro-ortho-toluidide of 2,3-hydroxy-naphthoic acid.

9. The process which comprises coupling diazotized 3-benzoyl-amino-4-methoxy-aniline with an alpha-naphthylamide of 2,3-hydroxy-naphthoic acid.

WILFRED ARCHIBALD SEXTON.